United States Patent
Ashwood-Smith et al.

(10) Patent No.: US 7,466,681 B2
(45) Date of Patent: Dec. 16, 2008

(54) METHOD AND APPARATUS FOR SENSOR NETWORK ROUTING

(75) Inventors: Peter Ashwood-Smith, Hull (CA); Donald Fedyk, Groton (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 461 days.

(21) Appl. No.: 10/804,740

(22) Filed: Mar. 19, 2004

(65) Prior Publication Data

US 2005/0207376 A1 Sep. 22, 2005

(51) Int. Cl.
*H04Q 7/24* (2006.01)

(52) U.S. Cl. .............. 370/338; 370/395.31; 370/408; 370/409

(58) Field of Classification Search ........... 455/41.2; 370/395.31, 408, 409
See application file for complete search history.

(56) References Cited

U.S. PATENT DOCUMENTS

2003/0204623 A1* 10/2003 Cain .................... 709/241
2004/0010492 A1* 1/2004 Zhao et al. .............. 707/3
2004/0057409 A1* 3/2004 Kennedy ............... 370/338
2004/0203380 A1* 10/2004 Hamdi et al. ........... 455/41.2
2005/0122231 A1* 6/2005 Varaiya et al. ........ 340/870.01

* cited by examiner

*Primary Examiner*—Temica M. Beamer
(74) *Attorney, Agent, or Firm*—Anderson Gorecki & Manaras LLP (57) ABSTRACT

Sensor network routing uses distance information of sensors relative to a collector node, optionally along with non-unique key information, to route broadcasts from addressless sensors to a selected addressless collector. Distance calculation messages (DCMs) are used to set distance values on sensors relative to collectors. The distance values enable messages to propagate toward collectors to reduce the number of broadcasts. Self-assigned key information may be added to DCMs propagating in the network to enable routes to be determined through the network without assigning addresses to the participants. By storing the key information associated with the route, and causing sensors to only rebroadcast a message if the message contains a matching key at the matching distance position, broadcast paths may be created on the network. Optionally, diverse collectors and paths may be selected on the network by exchanging traffic condition indications and preferentially selecting paths with better traffic conditions.

21 Claims, 6 Drawing Sheets

METHOD AND APPARATUS FOR SENSOR NETWORK ROUTING

BACKGROUND OF THE INVENTION

1. Field of the Invention

The present invention relates to communication networks and, more particularly, to a method and apparatus for sensor network routing.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network.

There exists a class of networks in which a huge number of sources of data, referred to herein as sensors, may be distributed in an ad-hoc fashion. The sensors may be configured to generate, monitor, or capture many types of data, such as information related to temperature, position, RF-ID presence, water level, stress, light level, machine status, and numerous other types of data. The sensors, in addition to producing data, may also act as wireless transmit devices to transmit data from other sensors to allow the data to be received at a collection point. Generally, traffic patterns in such a network will tend to be very focused and will flow either from a well known focal point out to the other nodes, or the reverse, from all those nodes back to the focal point. In these networks rarely, if ever, does traffic flow in any other pattern.

FIGS. 1A-1E illustrate a network 10 in which a collector 12 is configured to collect information from a plurality of sensors 14 and to communicate with sensors in its vicinity. As shown in FIGS. 1A-1E, data from the sensors is communicated via other sensors to the collector to enable the collector to obtain data from various points of interest in the network.

Figure 1A:
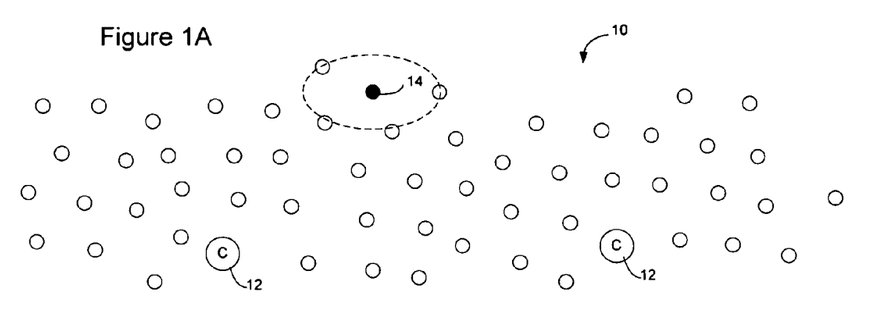
FIGS. 1A-1E are functional block diagrams of a portion of an example communication network.
Figure 1B:
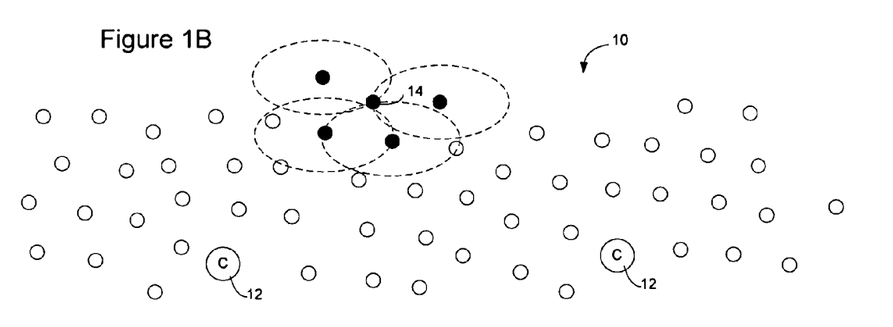
Figure 1C:
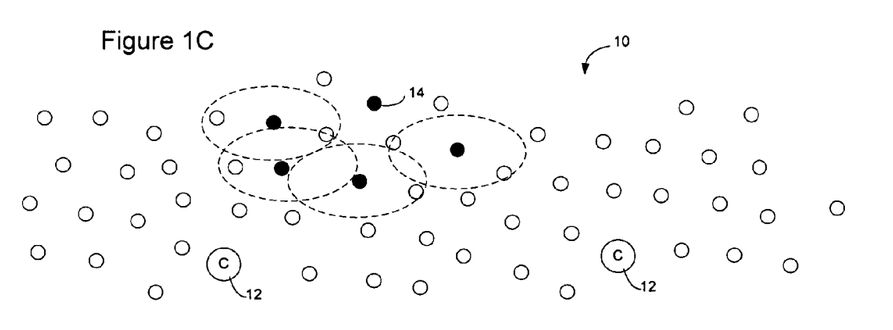
Figure 1D:
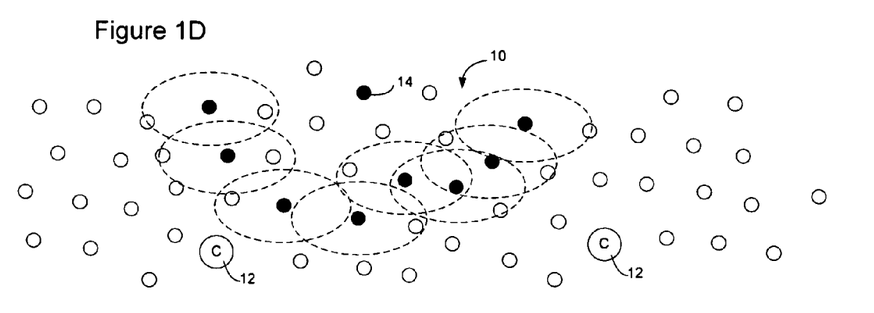
Figure 1E:
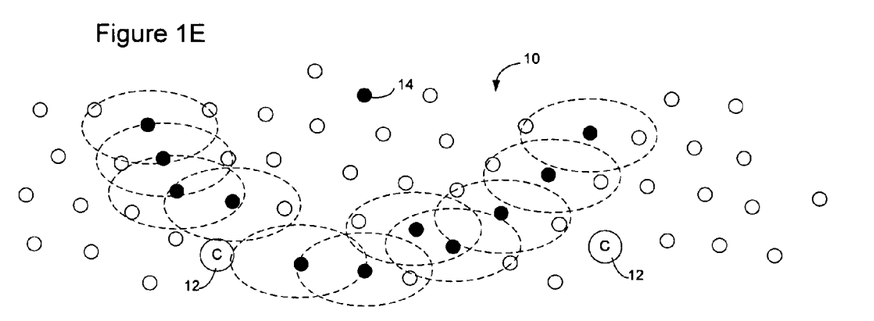

FIGS. 1A-1E illustrate a sensor network in which all sensors are configured to transmit all data packets received. As shown in FIGS. 1A-1E, a message originating at a sensor 14 will be received by its neighbors. The neighbors (FIG. 1B) will also transmit the message in a pattern resembling a wave emanating through the network (FIGS. 1C-1E). Eventually, multiple copies of the message will arrive at one or more collectors 12 (FIG. 1E). While this presents a viable manner to transmit information reliably through the network, it causes excessive replication of messages which can cause congestion on the network and waste resources of the sensors on the network.

Sensors on the network typically have limited resources such as limited power, memory, transmission and processing capacity, and hence minimizing the number of transmissions on a sensor network is desirable. One way to do this is to introduce a notion of routing, which may be used to cause transmissions to propagate along paths in the sensor network. The broadcast nature of the transmissions emanating from the sensors as well as several other features of the sensor network, such as the fact that the sensors may be mobile and may be distributed in an ad-hoc nature, render most of the available routing techniques inapplicable. Additionally, several of the traditional network routing techniques require the transmission of routing updates between sensors, which themselves may deplete performance of the network and may not be able to be implemented given the limited resources of the sensors.

SUMMARY OF THE INVENTION

The present invention overcomes these and other constraints by providing a method and apparatus for sensor network routing. According to an embodiment of the invention, distance calculation messages are used to set distance values on sensors relative to collectors on the network. The distance values enable messages to be routed only toward the collectors to thereby reduce the multiplicity of messages attendant to transmission of a message on the network. Additionally, self-assigned key information may be added to distance calculation messages propagating in a sensor network to enable routes to be determined through the network. By storing the key information associated with the route, the sensors can direct a message to a collector along one or more unique paths and the collector may direct a message back toward the sensor along the same path(s). Optionally, traffic level indications or other network condition information may also be added to the distance calculation messages to allow diverse paths to be selected on the sensor network.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to an embodiment of the invention, distance information, as well as self-assigned key information, may be added to distance calculation messages in a sensor network to reduce the message volume on the network and optionally enable routes to be determined through the network. Additionally, traffic level indicators may also be added to allow diverse paths to be selected on the sensor network.

In the following description, it will be assumed that sensors have a sensor ID or other information associated with them so that they may be identified on the network. This assumption is not part of the invention, however, but rather reflects the reality that a network administrator or other person receiving data from the sensor network may desire to know where the data originated on the network. For example, assume there are 100 temperature sensors on a thermoplastic injection molding machine. If one of the sensors identifies an out of range temperature and sends an alert, it may be useful for the machine operator to know where the temperature anomaly is occurring on the machine. Thus, it will be assumed that each sensor has an identification value. The identification value may be associated with a physical location, or may be a sensor number. The sensor identification may be used in numerous ways on the network, as discussed below, such as to identify the sensor as the source of a data message or to identify the sensor as the target of a message. As discussed in greater detail below, the sensor identification is not used, according to an embodiment of the invention, to route information on the sensor network.

FIGS. 2A-2D illustrate an embodiment of the invention in which distance information is computed by sensors on a network indicating a relative position of the sensor to a collector node on the sensor network. As shown in FIGS. 2A-2D, sensors on a communication network may be assigned a distance value relative to collector nodes on the sensor network such that sensors that are only one hop away from a collector node will be assigned a distance of "1," sensors that are two hops away from the collector node will be assigned a distance of "2," and so forth. Assigning distance values to nodes is discussed in greater detail below.

Assuming the nodes have been assigned a distance value, the distance value may be used to constrain forwarding of data on the sensor network by configuring sensors to only forward data messages that have distance values less than or equal to a particular value. For example, in FIG. 2A, assume that a sensor a distance of "4" from the nearest collector generated a data message and broadcasted the data message using an omnidirectional antenna. All sensor nodes in the immediate vicinity of the sensor would receive the packet. As discussed above in connection with FIGS. 1A-1E, if all of the sensors re-broadcast the data message, a relatively large number of data messages will be broadcast before the wave of rebroadcasts reaches a collector.

Figure 2A:
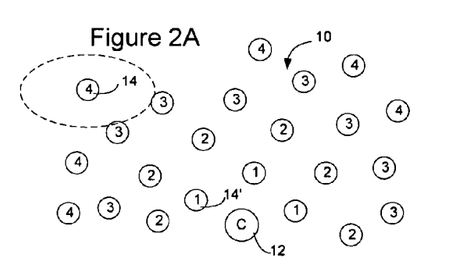
FIGS. 2A-2D are functional block diagrams of a portion of a communication network illustrating transmission of a data message using a routing protocol according to an embodiment of the invention.
Figure 2B:
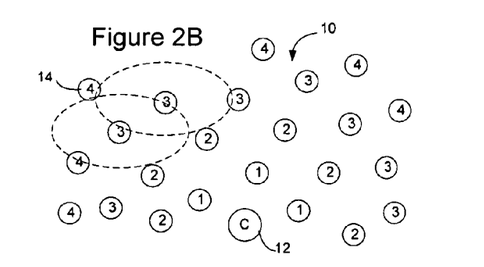

In FIGS. 2A-2D, the sensor knows its distance from the collector, however, which in this example is "4." According to an embodiment of the invention, the sensor includes this distance information in the message, and only those sensors having a distance value less than the distance value of the message will rebroadcast the message. Thus, in the Example illustrated in FIGS. 2A-2D, the message will be received by sensors having a distance value equal to "4," sensors having a distance value equal to "5," (not shown) and sensors having a distance value equal to "3." However, since the distance value of the message is equal to "4," only those sensors with a distance value equal to "3" or less will rebroadcast the message, as illustrated in FIG. 2B.

Figure 2C:
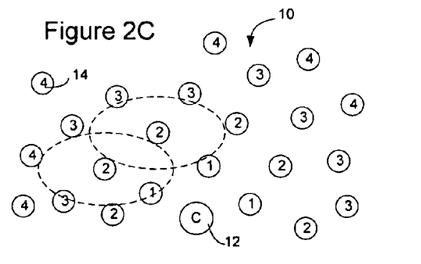
Figure 2D:
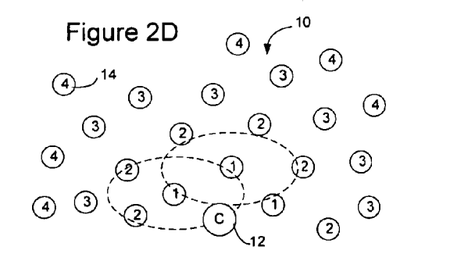

Prior to rebroadcasting the message, the sensors that receive the message and have a distance value equal to or less than "4" will reduce the distance value of the message by an increment, which in this example has been chosen to be 1. Thus, the distance value of the message will be reduced to "3" and the message will be rebroadcast by the sensors as shown in FIG. 2B. This process will iterate as shown in FIGS. 2C and 2D with sensors closer to the collector node reducing the distance value of the message and rebroadcasting the message until the message reaches the collector node.

The use of distance values based on numbers of hops from the collector node is more robust than using simple geometrical coordinates because it allows for obstacles or anomalies within the network to be accommodated by the network topology. For example, assume that a large hill was interposed between the collector node and one of the sensors. If that sensor was geographically closest to the collector, all traffic would be routed to it through a purely geographical routing mechanism. However, the closest sensor may be unable to reach the collector node due to the hill. By using hops to determine distance instead of coordinates, the natural transmission characteristics of the network are accommodated. Additionally, using the number of hops doesn't require any knowledge of the sensor's position as only the relative position is important. Where the sensor and collector are mobile, the mobility may be accommodated by periodically updating the distance values on the sensors on the network as discussed in greater detail below.

Figure 3:
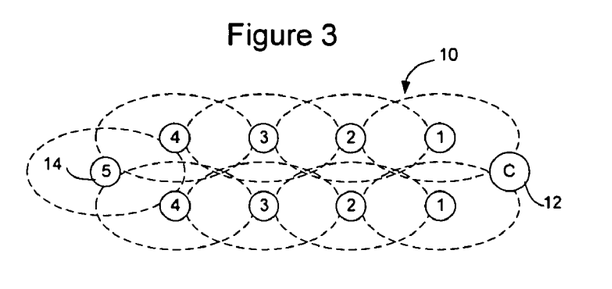
FIG. 3 is a functional block diagram of sensors forming a path through the communication network of FIGS. 2A-2D according to an embodiment of the invention.

FIG. 3 illustrates the procession of rebroadcasts through the network. As shown in FIG. 3, the original data message is received by successively closer sensors and relayed toward the collector node without causing the data message to be excessively rebroadcast. However, in a relatively populated sensor network, some duplication of the data message may still occur, as illustrated in FIG. 3. Where this is desirable for redundancy purposes, this embodiment allows multipath transmissions to occur through the network while reducing unnecessary duplication and avoiding problems associated with geographic based routing.

Figure 4:
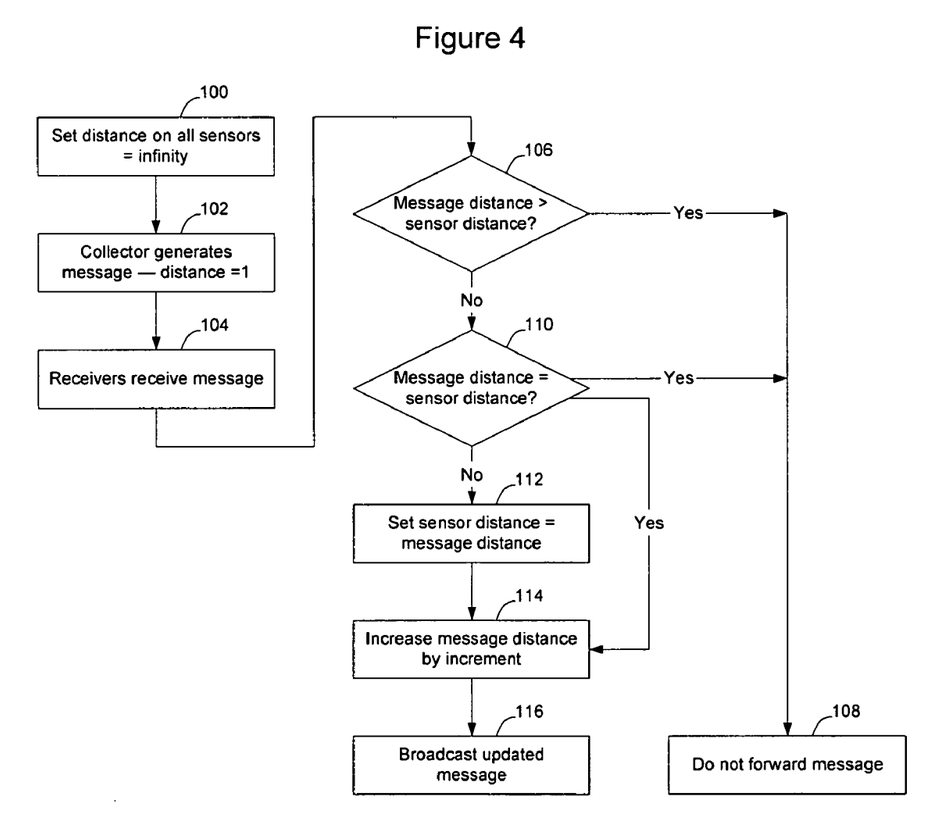
FIG. 4 is a flow chart illustrating a process of assigning distance information to sensors in a communication network such as the network of FIGS. 2A-2D according to an embodiment of the invention.

FIG. 4 illustrates a process of setting distance values on the sensors. The process may be implemented by software routines running on the sensors and collector as discussed in greater detail below, or may be implemented in a number of other manners.

As shown in FIG. 4, initially, the distance values on the sensors on the network are set to an arbitrarily large number (100). In the illustrated embodiment the value has been set to infinity. Alternatively, the distance value could be set to zero or another number indicating that the sensor is to rebroadcast all messages regardless of the distance value contained in the data message.

A collector periodically will generate a distance calculation message and broadcast the DCM onto the sensor network (102). The distance indicator in the distance calculation message may be set to 1 or another number indicating that the distance calculation message was generated by the collector node. Those receivers within range receive the message (104) and may use the distance indicator from the message to update their distance, depending on the value of the distance indicator and the current sensor distance indicator.

Specifically, according to one embodiment of the invention, if the message indicator is greater than the distance indicator in the sensor (106), the sensor node can infer that the distance calculation message came along a path that is longer than its currently known path(s), and thus will not update its distance indicator. Also, the sensor will not forward the distance calculation message (108) to prevent excessive traffic from propagating on the network. In this manner, distance calculation messages will propagate on the sensor network as long as they are useful to the sensor nodes on the network, and will be self-quenching thereafter such that distance calculation messages will not propagating endlessly on the network.

If the message indicator is not greater than the distance indicator in the sensor (110) the sensor will determine if the message indicator in the message is the same as its current distance indicator (112). If the distance indicator in the distance calculation message is the same as the sensor's current distance indicator, the sensor may handle the message in several different ways. Specifically, the sensor may ignore the distance calculation message and not retransmit it (108), or may update the distance indicator in the distance calculation message (114) and retransmit it (116). Failing to retransmit the distance calculation message when the message indicator in the distance calculation message is the same as the sensor distance indicator will enhance the self-quenching aspect to prevent potentially unnecessary propagation of distance calculation messages, but will also increase the healing time for changes to the network, as discussed in greater detail below.

If the message distance is less than the sensor distance, the sensor will set its current distance indicator to correspond to the message distance (112). The sensor will then increase the distance indicator in the distance calculation message so that the next sensor knows how many other sensors have handled the distance calculation message (114) and rebroadcast the distance calculation message on the network (116).

Networks change over time due to the addition of sensors, removal of sensors or the occurrence of fault conditions in sensors, and the addition/removal of collectors. Additionally, sensors and collectors may be mobile and other objects to transmissions may be introduced to the network or removed from the network. All of these events may influence the distance values of the sensors on the network. According to an embodiment of the invention, the distance values on the sensors are configured to decay over time such that the sensor distance values gradually increase. Increasing distance values on the sensors allows the sensors to receive distance calculation messages that contain lower distance values. Hence, the sensors will process the distance calculation message and forward the distance calculation message on the network to allow recent distance calculations to take place on the network. The recalculation of distance values on the network allows the network to heal or adapt to the changing conditions on the network.

For example, assume in FIG. 1, that one of the sensors 14' adjacent the collector experienced a fault. The collector will generate a distance calculation message and transmit it on the network. When the other sensors at distance '1' receive the message, they will compare the distance indicator in the distance calculation message with their current distance value, and drop the message. Thus, the sensors behind the failed sensor, will not obtain access to the distance calculation message. Additionally, even in the situation where sensors are configured to transmit distance calculation messages on the network that have a distance indicator the same as the sensor distance indicator, the sensors sitting behind the failed sensor would not update their distance value as they still believe there is a path through the failed sensor. However, by causing the sensors to periodically increase their distance from the collector, those nodes can obtain a new distance value that reflects the new reality of the network. When the sensor is fixed or otherwise rejoins the network, paths through that sensor may be reestablished in the same way.

As discussed above with respect to FIGS. 2A-2D, and FIG. 3, the sensors on the network will use the distance values set using a distance calculation message to determine whether they should forward a message on the network. This may be done in a number of manners and the invention is not limited to the particular method discussed above.

The distance value determination method may be used advantageously to reduce the size of a broadcast cloud on a sensor network. It doesn't however, allow a single path to be determined through the network, at least not in densely populated sensor networks.

Figure 5:
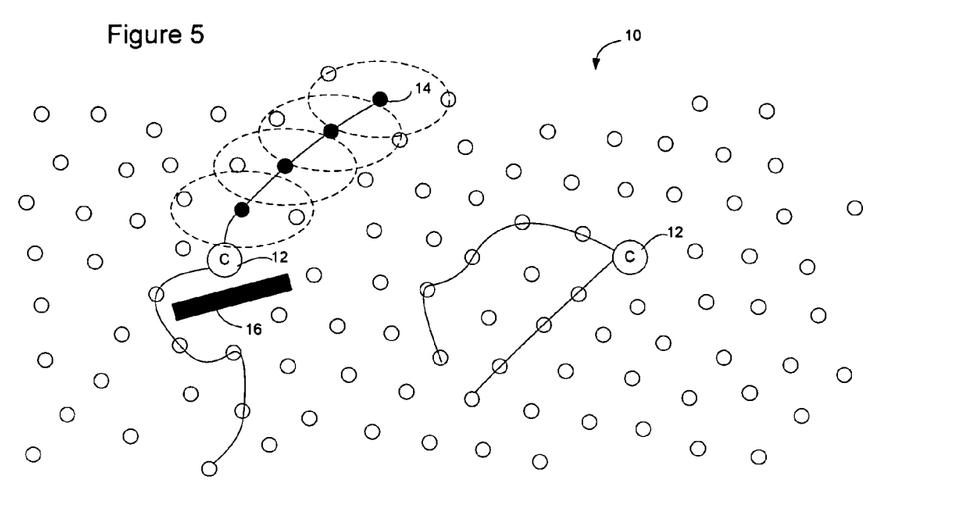
FIG. 5 is a functional block diagram of a communication network in which distance information and key information are used to form paths through the sensor network.

FIG. 5 illustrates a sensor network in which a particular path is selected for transmission through the network. This allows the path to be configured to route around obstacles 16 on the network. As shown in FIG. 5, the path includes nodes that are configured to broadcast messages received from the originating sensor.

According to an embodiment of the invention, each node on the sensor network selects a key to be used to identify it from other sensors on the network. The key is not an identification of the sensor, since the network may contain multiple sensors with identical keys. Thus, the sensor key does not need to be unique on the network and in general may be self-assigned. For example the key could be a pseudo-random number of any bit length that may be used by that sensor to differentiate itself from other neighboring sensors in a manner discussed below.

Assume, initially, that each sensor in the network adopts a key. The key may be one bit long, two bits long, several bits long or another particular number of bits long. When the collector node generates a distance message, the adjacent (level 1 sensors) will receive the distance message and use the distance message to set their distance indicator. When the sensors update the distance message with the new distance value, they will also retrieve any keys associated with the message and add their key to the list of keys associated with the message. In this manner, paths from the collector node through the network may be identified by the distance from the collector node as well as by the list of keys included with the message. When a distance calculation message is used to reset the distance values on the sensor, the keys are retained by the sensor to indicate a path through the network.

When a sensor node is required to send a data message to the collector node, it will set the distance value on the data message to its current distance value, and will include the keys from the distance calculation message that it used to set the distance value, and which are indicative of a path through the network to the collector. The sensor will then transmit the message including the distance value and key set.

Nodes receiving the message will determine if they are to rebroadcast the message by looking at the distance indicator and the keys. Only those sensors having distance values less than the message and a key matching at the proper distance position will retransmit the message. Thus, a particular path may be defined though the network and used by the sensors to determine whether to retransmit a received data message.

Figure 6:
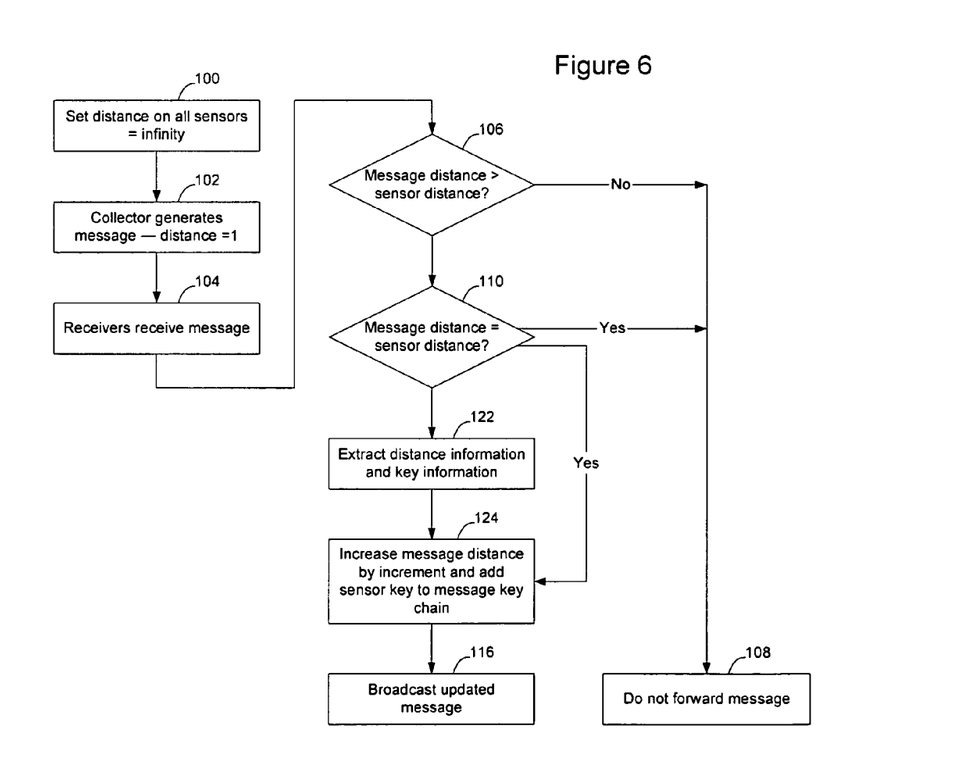
FIG. 6 is a flow chart illustrating a process of assigning distance information and distributing key information to sensors in a communication network such as the network of FIG. 5 according to an embodiment of the invention.

FIG. 6 illustrates a process by which a receiver may obtain a unique key chain indicative of a path through the sensor network. The process is the same as that described above with respect to FIG. 4, except for when the message distance indicator is equal to or less than the sensor distance. Specifically, shown in FIG. 6, if the message distance indicator is less than the sensor distance, the sensor will extract the distance information and key information from the distance calculation message (122). Extracting the key information allows the sensor to extract path information representative of the sensors between it and the collector that handled the message prior to having it arrive at the sensor.

The key chain represented by the string of keys represents a path through the network to the collector node that issued the distance calculation message. If the distance included in the distance calculation message is less than the distance indicator associated with the sensor, the path represented by the key chain is shorter than any other path of which the sensor is aware, and is thus the best path through the network. Accordingly, the key chain is stored by the sensor as the currently preferred path to the nearest collector node. The sensor will then add its key to the key chain in the distance calculation message, update the distance value in the distance calculation message, and transmit the updated message.

The sensor will then increase the message distance by the distance increment and add its key to the message (124) and then broadcast the updated message (126). Similarly, if the message distance is the same as the sensor distance, the sensor may still represent the best path through the network for a subset of network sensors. Accordingly, the sensor may be configured to update the message (124) and broadcast the updated message (126). Alternatively, the sensor may be configured to discard the message (108).

Figure 7:
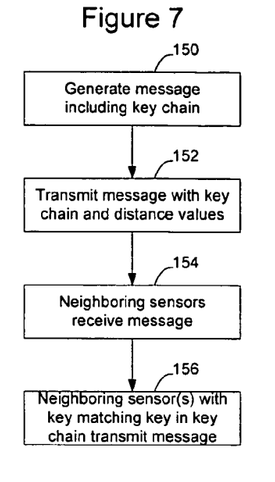
FIGS. 7-10 are flow charts illustrating processes used by sensors and collectors on the network of FIG. 5 to exchange information and to communicate on the sensor network.

FIG. 7 illustrates a process or transmitting a data message from a sensor to a collector node over the path represented by the keys. As shown in FIG. 7, a sensor, upon sensing something worthy of transmission to a collector node, will generate a data message (150) and include in the data message the key chain associated with the preferred path to the collector node. The message will also indicate a distance indicator indicating the distance of the sensor from the collector node. The sensor will then transmit the message on the sensor network (152).

Neighboring sensors will receive the message (154). Those sensors with a distance value less than or equal to the distance value included in the message will assess the key in the key chain associated with their distance value. If the key in the message at that distance location matches the sensor's key, it will rebroadcast the message (156). If not, the sensor will not rebroadcast the message. In this manner only those sensors with the proper key at the proper distance position will rebroadcast the message causing the message to follow a predefined path through the sensor network.

Using keys rather than sensor IDs allows a predefined path to be used without incurring the overhead associated with naming the sensors or with using a relatively longer unique sensor ID. For example, assume that there are a billion sensors in use in the world. A unique sensor ID may require more than 100 bits to be used to uniquely identify that sensor from all other sensors on the network. However, in a sensor network it may be that a given sensor can only communicate with between a few and one hundred neighboring sensors. Allowing sensors to use keys to differentiate between each other restricts the number of rebroadcasts through the network without incurring the overhead associated with using unique sensor IDs.

For example, assume that the sensor key was a one bit value. Using a one bit value would reduce traffic on the sensor network by one half, because statistically half of the sensors receiving the message would not have a matching key at the proper distance location. Accordingly, that half of the sensors would not rebroadcast the message thus saving resources and reducing traffic on the network by 50%. A two bit key would reduce traffic on the sensor network by 75% because, statistically, only one in 4 sensors would be expected to have a matching key at the proper distance location, assuming the keys are generated in a pseudo-random fashion. In a network with densely populated sensors, or in a network where redundant transmissions should be closely curtailed, an 8 bit key would be expected to reduce redundant traffic by in excess of 99%, regardless of the number of sensors used on the network. The length of the key and its effect on traffic conditions thus depends on the density of sensor placement (how many sensors will see a broadcast from a given sensor) rather than on the number of sensors on the network.

Figure 8:
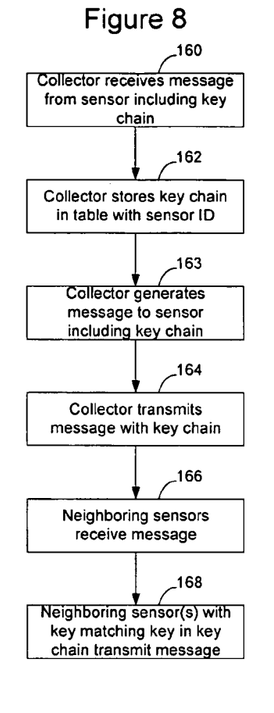

Traffic may also be transmitted from the collector node to the sensor nodes using the key mechanism described above. FIG. 8 illustrates one embodiment of a process that may be used to transmit data from the collector node to an identified sensor node. Specifically, once the collector receives a message from a sensor, it has the key chain that was used to transmit the message from the sensor to the collector (160). This key chain can be stored by the collector node (162) and used, when required, in a data or control message to be sent from the collector node to the sensor. As discussed above, each sensor has an identification on the network. This identification may be used, for example, to enable the collector to store key chain information associated with the sensors and to identify particular messages as being addressed to a particular sensor or group of sensors. The sensor identification is not the same as its key, however, as the key may not be unique on the network and, indeed, may not be unique within a domain containing the collector and its adjacent sensors.

To issue a message to a sensor, the collector node generates a message (163), which will be referred to herein as a control message, and transmits the control message on the network (164). The control message may contain data or instructions for use by the sensor in any number of ways, for example to configure the sensor, reset the sensor, or to perform any number of functions on the sensor. The control message may include other information as well, e.g. a confirmation receipt relating to a recently generated message, as well and is not limited to a message containing control information. The collector node includes in the message the key chain associated with the most recent message from the particular sensor and transmits the message on the sensor network. Neighboring sensors receive the message (166) and those with a matching key at the appropriate distance location will retransmit the message until it reaches the intended sensor (168).

To differentiate messages generated by a collector and messages generated by a sensor, the message may contain a tag indicating that it should be transmitted away from the collector instead of being transmitted toward the collector. This same tag may also be used to indicate to the sensors that a distance calculation message should be transmitted away from the collector. The invention is not limited to a particular embodiment of how the sensors are informed that particular messages should be transmitted toward the collector and that others should be transmitted away from the collector.

Figure 9:
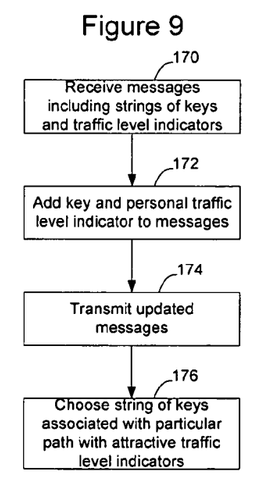

FIG. 9 illustrates a process whereby a sensor on the network can chose between competing paths on the network. Occasionally, a node may receive distance update messages from neighboring sensors that contain different keys but which contain the same distance indication. The node, at that point, knows two equally valid paths to the collector node through the network. Optionally, to enhance redundancy, the sensor may store both key chains, or multiple key chains, so that the sensor has redundant paths through the network. A data message may thus be broadcast with both key chains or optionally two or more different messages may be broadcast with the same data to enhance the likelihood that at least one will reach the collector.

Optionally, after a sensor broadcasts a message, it may listen for a rebroadcast of that message on the network. If it receives a copy of the message it may infer that a sensor with the appropriate key in the correct distance location received the message and retransmitted it on toward the collector on the network. A failure to receive a rebroadcast of the message may be inferred as a failure on the network which may be communicated to the originating sensor and, optionally, to the collector through an alternative key chain. Alternatively, the sensor may first try to rebroadcast the same message to see if it is able to get the message to propagate through the network on a second attempt before alerting to failed transmission. Allowing the sensors to listen for confirmation of transmission to ensure transmission through the network makes the protocol more robust.

According to an embodiment of the invention, diverse paths may be preferentially selected in the selection process by allowing the sensor to select the key chain associated with a less congested path through the network.

Traffic engineering is conventionally done by allowing each node in a communication network or domain to build a network topology map and receive link state advertisements indicating connections that have been configured over the links. By maintaining a link state table, the nodes are able to determine metric allocations on the network and hence where congestion is likely to occur on the network, and create new routes through the network to enable communication sessions to take place without using the congested resources. In a sensor network or other network based on broadcasts, the notion of link is inapplicable. Hence, many traditional traffic engineering approaches cannot be used to select diverse paths through the network. Additionally, the sensors may not have sufficient processing power to compute routes or may not have sufficient power to expend on dissemination of messages related to network conditions.

According to an embodiment of the invention, diverse path selection is performed by the sensors by allowing the sensors to choose between equally valid routes to preferentially select a route through the sensor network to avoid heavily used nodes. Thus, the nodes may take advantage of multiple paths for redundancy or traffic balancing without maintaining link state tables and distributing link state advertisements to the nodes on the domain.

As shown in FIG. 9, when a collector node generates a message, that message is sent to neighboring sensors which use the message to update their distance and/or key chains (170). A sensor receiving the message will also add its key to the message, increment the distance value, and add a traffic level indicator to the message (172). The traffic level indicator may be an indication of the relative traffic level, an absolute traffic level, or another type of traffic level indication such as a single bit indicating whether its traffic volume is high or low. For example, a sensor in one part of the network may be capable of handling 20 messages per minute and may currently be handling 5 messages per minute. In that instance the relative capacity of the sensor is 75%. In another example, the traffic indicator may include one or two bits indicative of the average, mean, or instantaneous traffic at the sensor. For example, the bits may be used to signal the ability to handle additional traffic. The bits may be included as part of the key or may be separate from the key. The sensor will then transmit the updated message (174).

A sensor receiving distance update messages from multiple adjacent nodes may evaluate the key chain and the traffic level indicators associated with the messages to pick preferentially a key chain that has advantageous traffic indicators (176) to thereby choose a path through the network that is likely to use sensors handling a lower level of traffic. In this manner, diverse paths may be selected to enable sensors to choose routes through the network to avoid congested areas and to allow traffic patterns to automatically adjust to alleviate congestion at natural bottlenecks on the sensor network. Balancing traffic patterns may be done by avoiding congestion, seeking non-congested areas, or in any other manner. Updated traffic conditions will automatically be distributed on the network with dissemination of new distance calculation messages. When a distance calculation message is received with the same distance value but with more advantageous traffic indicators, the keys from the new distance calculation message may be saved, the key chain, distance indicator, and traffic indicator on the message updated, and the updated message transmitted on the network. Several paths may be maintained, as discussed above, to enhance redundancy on the network and provide alternative paths should it be determined that the transmission along the primary path is not available.

Alternatively, sensors that have reached capacity and are unable to handle traffic from other nodes may choose to not transmit distance calculation messages to prevent new paths from being determined through that sensor. Old paths through the sensor will continue to be valid until the sensors using those paths increase their distance value and obtain new paths through the network (the old path will not be updated since the congested sensor will not be advertising that path). This will cause congestion at the sensor to drop off allowing the sensor to once again transmit distance calculation messages on the network.

Figure 10:
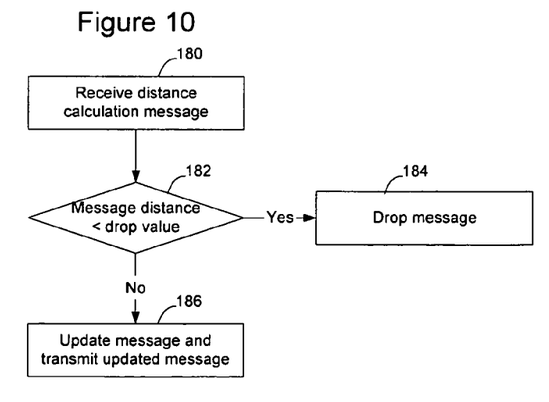

FIG. 10 illustrates another embodiment of the invention in which sensors are configured to forward distance calculation messages on the network that contain a distance value less than a predetermined drop value. As discussed in greater detail below, allowing the distance calculation messages to propagate on the network enables sensors to obtain distance calculation messages originated by different collectors, to thus enable the sensors to maintain redundant paths to different collectors to enhance redundancy on the network.

According to this embodiment of the invention, distance calculation messages may travel a particular distance on the network to enable the network sensors to have a larger view of the network. For example, as shown in FIG. 10, when a sensor receives a distance calculation message (180) it will determine whether the message distance is greater than a configurable drop value (182). If the message distance is greater than the drop value, the sensor will drop the message and not forward it on the network (184). If the message distance is less than or equal to the drop value, the sensor will update the message and transmit the updated message (186). As described above, updating the message may include incrementing the message distance value, adding key information, adding a traffic level indicator, and otherwise adding information to the message.

Comparing the message distance value with a configurable drop value enables distance calculation messages to be propagated a particular distance on the network and then to stop being re-broadcast. Since a sensor network may be very large, with numerous sensors and collectors, endless rebroadcasts by the sensors without a quashing mechanism may cause dissemination of distance calculation messages to propagate endlessly.

Since one objective of enabling distance calculation messages to propagate a particular distance on the network is to enable sensors to have distance values and optionally key chains associated with paths to multiple collectors, the drop value may be set to be larger than the average interstitial spacing of collectors on the network. For example, if collectors are typically spaced at 10 sensor intervals, setting the drop value to be somewhat greater than 10 should enable most of the sensors, even those adjacent to collectors, to receive distance calculation messages from multiple collectors. The drop value may also be dynamically set depending on the characteristics of the network. Optionally, collectors may be configured not to re-broadcast distance calculation messages received from other collectors to prevent paths through the network from intersecting more than one collector.

To enable a sensor to discern paths to multiple collectors, the collector that originated the distance calculation message should be discernable from the message. If the identity of the collector is not discernible, a sensor may believe it has stored paths to multiple collectors when it has actually stored multiple paths to the same collector. Thus, according to an embodiment of the invention, the collector may include an indicator of its identity, such as a self-assigned key value, that may be used to distinguish it from other neighboring collectors. The key value may be unique on the network or may be non-unique.

Optionally, where collectors assign key values on the network, the collector may listen for distance calculation messages to ascertain whether there are other collectors on the network that have also adopted the same key. Where adjacent collectors have adopted the same key it may be desirable to enable one or more of the collectors to reassign a new key to enable distance calculation messages from the sensors to be discerned by the sensors on the network.

To allow sensors to maintain path information to multiple collectors, a sensor, upon receiving a distance calculation message, will check the distance calculation message to determine if it originates from a collector for which it has a distance value and/or key chain. If so, the sensor will determine if the path represented by the distance calculation message should be stored, for example by determining that the path is shorter, it has a different key chain and hence represents a redundant path to the known collector, or it has more advantageous traffic indicators. If the path is to be stored, the sensor may save the distance value and key chain for possible future use for the transmission of data.

If the sensor determines that the path represented by the distance calculation message terminates at an unknown collector, it may determine that knowledge of the new path through the network may be advantageous and may make a new entry in its routing tables for the new collector and path information. In either instance, determination as to whether to forward the message (discussed above) is independent of the decision as to whether to store the path information represented by the message.

Since sensors in this embodiment are configured to forward all messages with a distance value less than a configurable drop value, a mechanism needs to be instantiated to prevent the same distance calculation message to reflect between sensors on the network. For example, assume that a distance calculation message of distance 0 is generated by a collector and forwarded onto the network. The sensor at distance 1 will receive the distance calculation message, increment the value, and forward it onto the network. The sensor at position 2 will do the same thing at which time the distance value associated with the message will be equal to 2. However, when sensor 2 broadcasts the message, it will be received by sensors at position 1 and 2, as well as sensors at position 3. If a reflection reduction mechanism is not introduced, the sensor at position 1 will re-broadcast the same distance calculation message, this time with a distance value set equal to 3. Thus, a message may reflect between nodes on the network with incrementing distance values until the distance value in the message increments to be larger than the drop value.

According to one embodiment of the invention, a message identifier is introduced into the message to enable the message to be distinguished from other distance calculation messages propagating on the network. In this manner, a sensor may check to see whether it has previously handled a particular message and only forward it onto the network once, to thereby prevent sensors from reflecting distance calculation messages on the network.

Enabling distance calculation messages to propagate on the network regardless of sensor distance value enables several self-healing mechanisms to be used to allow network reconfiguration to reflect conditions on the network. For example, as discussed above, one way to enable path information to be updated on the network is to cause the sensor distance to be periodically incremented to enable the sensors to look for new routes through the network. This mechanism may be used in this embodiment as well. Additionally, routes through the network may have a time-out value associated with them to enable older routes to be phased out in favor of new routes so that routes may automatically change over time to reflect network conditions. The invention is not limited in this manner, however, as other mechanisms may be used as well.

Optionally, according to an embodiment of the invention, the collector may include a load indicator indicating the traffic conditions at the collector and its ability to handle additional sensor data messages. Including a load indicator enables sensors on the network to preferentially elect to send data messages toward collectors with the ability to handle the data messages to perform load balancing on the network. For example, it may be that a particular collector is 5 hops away from a sensor but is currently operating at 95% capacity, whereas another collector is 7 hops away from a sensor but is currently operating at 25% capacity. To enable the load on the collectors to be balanced, the sensor may select the route through the network to the second sensor so as to not overload the sensor that is operating at 95% capacity. The invention is not limited to this embodiment however, as other selection mechanisms may be used to preferentially select one path over another through the network, both to preferentially select one collector over another and to select one path to the collector over another path to the same collector.

The sensors and collector nodes may communicate with each other using one or more wireless technologies. Examples of several types of wireless technologies include one of the Institute of Electrical and Electronics Engineers (IEEE) 802.11x wireless communication protocol (such as 802.11a, 802.11b, or 802.11g), one of the IEEE 802.16x protocols, the Universal Mobile Telecommunication System (UMTS) wireless communications protocol or another cellular protocol, any number of other wireless communication protocols, or one or more communication protocols that have yet to be developed. The invention is not limited to transmissions formed using a particular wireless communication protocol.

Although in this application a wireless-based network has been described, and the sensors have been discussed as communicating with each other and with collector nodes using various wireless protocols, the invention is not limited in this regard. Rather, the invention may be used more broadly with other types of communication technology, such as wireline, infra red, acoustic, and numerous other types of communication technology.

Failures on the network, such as the failure of a sensor on the network, may cause routes through the network to become obsolete. According to an embodiment of the invention, distance calculation messages are generated periodically on the network to update distance values, key chains, and optionally load indicators, on the sensors. This allows sensors on the sensor network to periodically update their routing information to take into account changes in topology on the sensor network due to failure or the addition of sensors on the network or due to changing traffic conditions.

Prior to receiving a distance calculation message on the network that would enable the sensor to obtain information to route the message on the network, the sensor may use simple broadcast mechanism to transmit messages to the collector node. Optionally, a particular distance value may be used to cause all receiving sensors to transmit the message for example in a pattern such as that illustrated in FIGS. 1A-1E. Alternatively, a keyless distance method may be used to transmit the message such as that illustrated in FIGS. 2A-2D. The invention is not limited to either of these particular methods. Receipt of a distance-less or key-less message may cause the collector node to generate a distance calculation message to update the network to the presence of the new sensor or the newly rebooted sensor.

Failure of a collector node on the network or addition of a new collector node to the network may be accommodated in much the same way. For example, assume that a collector node on the network failed. The failure may be sensed by adjacent nodes on the network which may then issue a broadcast message on the network to alert other collector nodes of the need to update the sensor network to take into account the failed collector node. The collector nodes adjacent the failing collector node can generate distance messages that will propagate through the network causing the sensors to obtain routes to other adjacent collector nodes. Optionally, the collector nodes, upon receiving a failure message, may also convey that information to a management system to enable the failure to be rectified. Alternatively, the sensor in the vicinity of the collector will automatically increased their distance values periodically until they receive a distance calculation message from a neighboring collector node. Thus, the network may be made to be self healing to accommodate both sensor and collector additions and failures.

Figure 11:
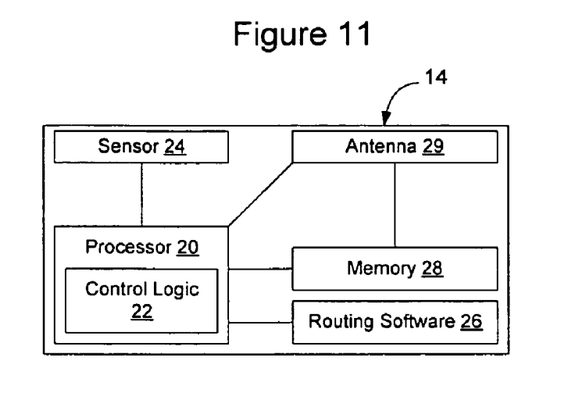
FIG. 11 is a functional block diagram of a sensor according to an embodiment of the invention.

FIG. 11 is a functional block diagram of a sensor 14 configured to implement an embodiment of the invention. The embodiment illustrated in FIG. 11 is a wireless sensor having a wireless antenna configured to enable the sensor to communicate using one or more wireless protocols. The invention is not limited to this embodiment as a wireline device or device configured to communicate using other technologies may be used as well.

As shown in FIG. 11, the sensor 14 generally includes a processor 20 containing control logic 22 configured to perform functions described to enable the sensor to collect information from sensing circuitry 24 and pass that information onto the sensor network 10. The sensor circuitry 24 may be configured to sense any number of different parameters and the invention is not limited to a particular type of sensor configured to use a particular type of sensor circuitry. Examples of types of sensors include pressure sensors, electrical sensors, motion sensors, presence sensors, temperature sensors, and numerous other types of sensors.

The processor may interface routing software 26 to enable it to perform the functions described above in connection with FIGS. 1-10. The sensor may also include a memory 28 to enable the sensor to store messages, routing information, and other information to enable it to make retransmission decisions with respect to messages received on the sensor network.

Figure 12:
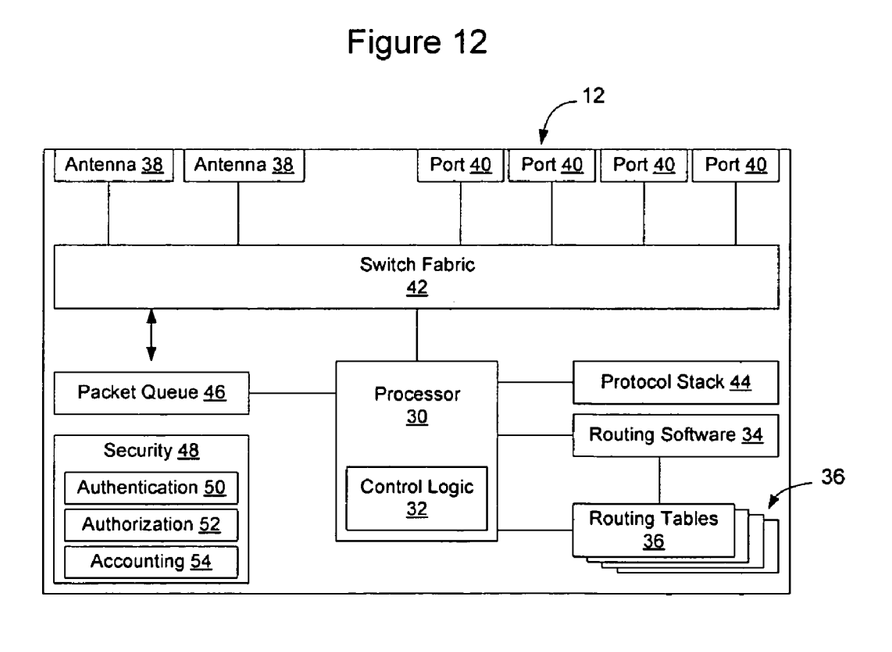
FIG. 12 is a functional block diagram of a collector according to an embodiment of the invention.

FIG. 12 is a functional block diagram of a collector node configured to implement an embodiment of the invention. As shown in FIG. 12, the collector node includes a processor 30 containing control logic 32 configured to interface with routing software 34 and routing tables 36 to enable the collector node to participate in communications on the sensor network. The routing software may be configured to implement the routing operations described above in connection with FIGS. 1-11 and may be provided on the collector node and configured to execute on the processor 30. Optionally, routing tables may be provided to store data for use with the routing software to enable the collector node to maintain information about the sensors, for example strings of keys that may be used to communicate with the sensors.

The collector also includes circuitry to enable it to communicate with sensors, such as one or more antennas 38, as well as additional circuitry to enable it to communicate with on another communication network. For example, the collector node may include one or more ports 40 to enable it to be connected to a wired network. Alternatively, the collector node may include an additional antenna to enable it to communicate using a wireless protocol separate from the wireless protocol in use on the sensor network to enable a wireless backhaul to be used to connect the collectors on the sensor network.

The various interfaces (wireless and wireline) may be connected to a switch fabric 42 that operates under the control of the processor 30. A protocol stack 44 containing data and instructions configured to enable the collector to participate in protocol exchanges on the wired or wireline backhaul network may optionally be included. Other conventional network element features, such as a packet queue 46 configured to temporarily store protocol data units for transmission on the network, may also be included. Additionally, the collector node may include a security module 48 containing an authentication module 50 configured to authenticate users, devices, or connections on the network, an authorization module 52 configured to determine appropriate authorization control information to prevent unauthorized access to the network, and an accounting module 54 configured to enable accounting entries to be established for communication sessions on the network. Other modules may be included as well and the invention is not limited to a particular implementation of the network device.

The functions described above may be implemented as a set of program instructions that are stored in a computer readable memory within the network element and executed on one or more processors within the network element. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of routing on a sensor network, the method comprising the steps of:
   receiving by a sensor a distance calculation message containing message distance information indicative of a number of hops to a collector node; and
   comparing the message distance information with current sensor distance information to obtain a distance result;
   wherein the distance message contains key information indicative of sensors on the network that have broadcast the distance message prior to reception by the sensor.

2. The method of claim 1, wherein if the distance result indicates that the current sensor distance is farther than the message distance information, the method further comprising the step of updating the current sensor distance information with the message distance information.

3. The method of claim 1, further comprising the step of extracting the key information from the distance message.

4. The method of claim 1, wherein the key information is a non-unique value associated with the sensors on the network.

5. The method of claim 1, wherein the distance message contains traffic condition information indicative of traffic conditions at the sensors on the network.

6. The method of claim 5, wherein the traffic conditions at the sensors may be used to select a preferential path through the network.

7. The method of claim 2, further comprising the steps of creating an updated distance message containing increased message distance information; and broadcasting the updated distance message.

8. The method of claim 7, further comprising establishing sensor key information associated with the sensor and including the sensor key information in the updated distance message.

9. The method of claim 1, wherein if the distance result indicates that the current sensor distance is the same as the message distance information, the method further comprising the steps of creating an updated distance message containing increased message distance information; and broadcasting the updated distance message.

10. The method of claim 1, wherein if the distance result indicates that the current sensor distance is the same as the message distance information, the method further comprising the steps of not rebroadcasting the updated distance message.

11. The method of claim 1, further comprising the step of periodically increasing the current sensor distance information.

12. A method of routing on a sensor network, the method comprising the steps of:
    receiving, by a sensor, a distance calculation message containing message distance information indicative of a number of hops to a collector node;
    using the message distance information to set a current sensor distance of the sensor from the sensor to the collector node;
    receiving a data message by the sensor from another sensor on the sensor network; and
    selectively rebroadcasting the data message if a distance value in the data message is equal to or less than the current sensor distance.

13. A method of routing on a sensor network, the method comprising the steps of:
    receiving, by a sensor, a distance calculation message containing message distance information indicative of a number of hops to a collector node;
    comparing the message distance information with current sensor distance information to obtain a distance result; and
    comparing the message distance information with a drop value.

14. The method of claim 13, wherein the drop value is independent of the current sensor distance and the distance value in the data message.

15. The method of claim 13, wherein the distance calculation message further comprises reflection prevention information.

16. The method of claim 15, wherein the reflection prevention information is a message identifier.

17. The method of claim 1, wherein the distance calculation message further contains collector identification information associated with an identity of a collector associated with the distance calculation message.

18. The method of claim 17, wherein the collector identification information is a key information that is not unique on the network.

19. The method of claim 17, wherein the distance calculation message further contains a collector load indicator.

20. The method of claim 12, wherein the step of selectively rebroadcasting the data message comprises comparing key information in the data message with key information associated with the sensor, and only rebroadcasting the data message if the data message contains matching key information.

21. The method of claim 20, wherein the key information associated with the sensor is not unique on the network.

* * * * *